Dec. 21, 1965  J. M. ANDERSEN  3,224,787
NESTABLE INDUSTRIAL CART
Filed Sept. 27, 1963  4 Sheets-Sheet 1
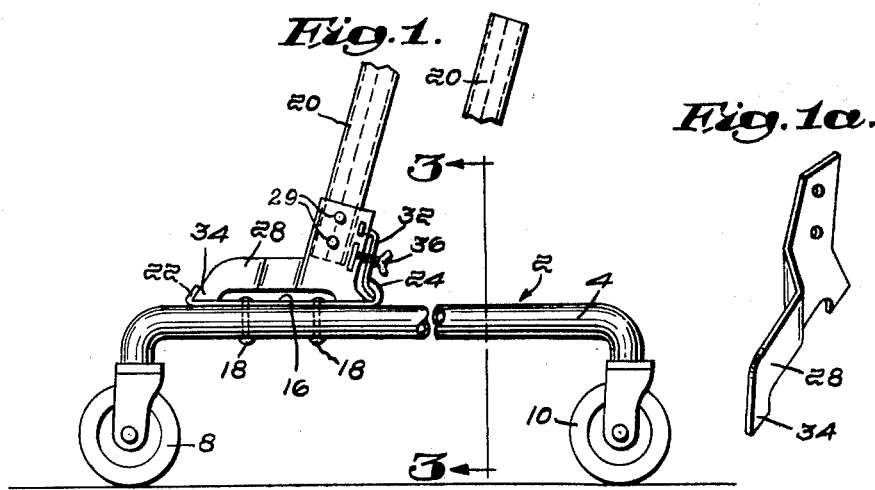
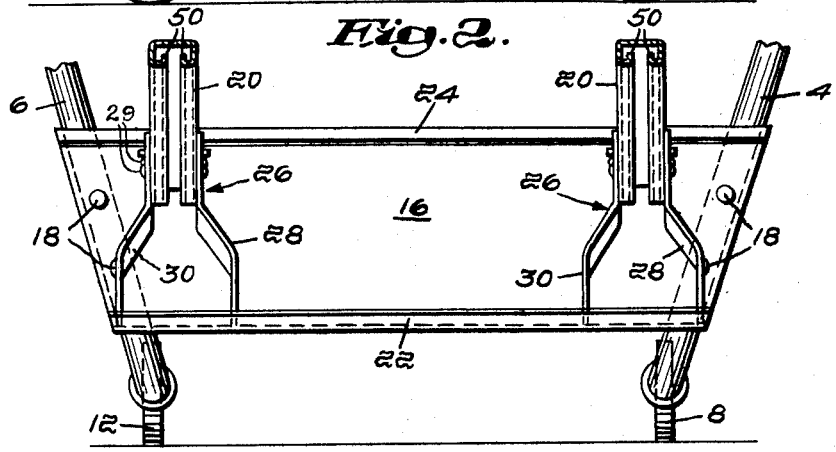
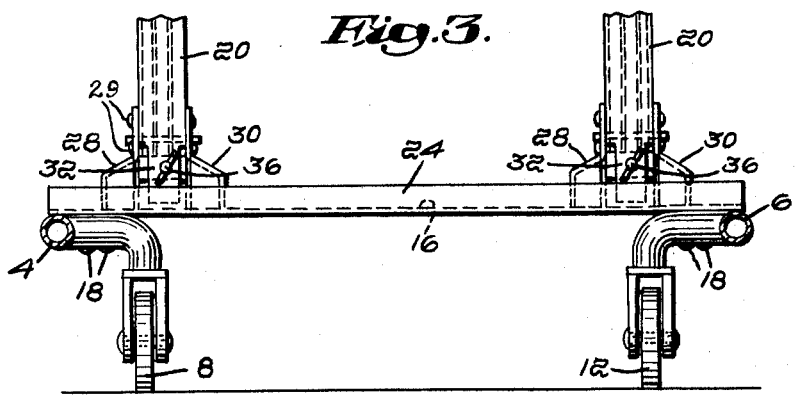
Inventor:
Johan M. Andersen,
by Russell, Chittick & Pfund
Attorneys

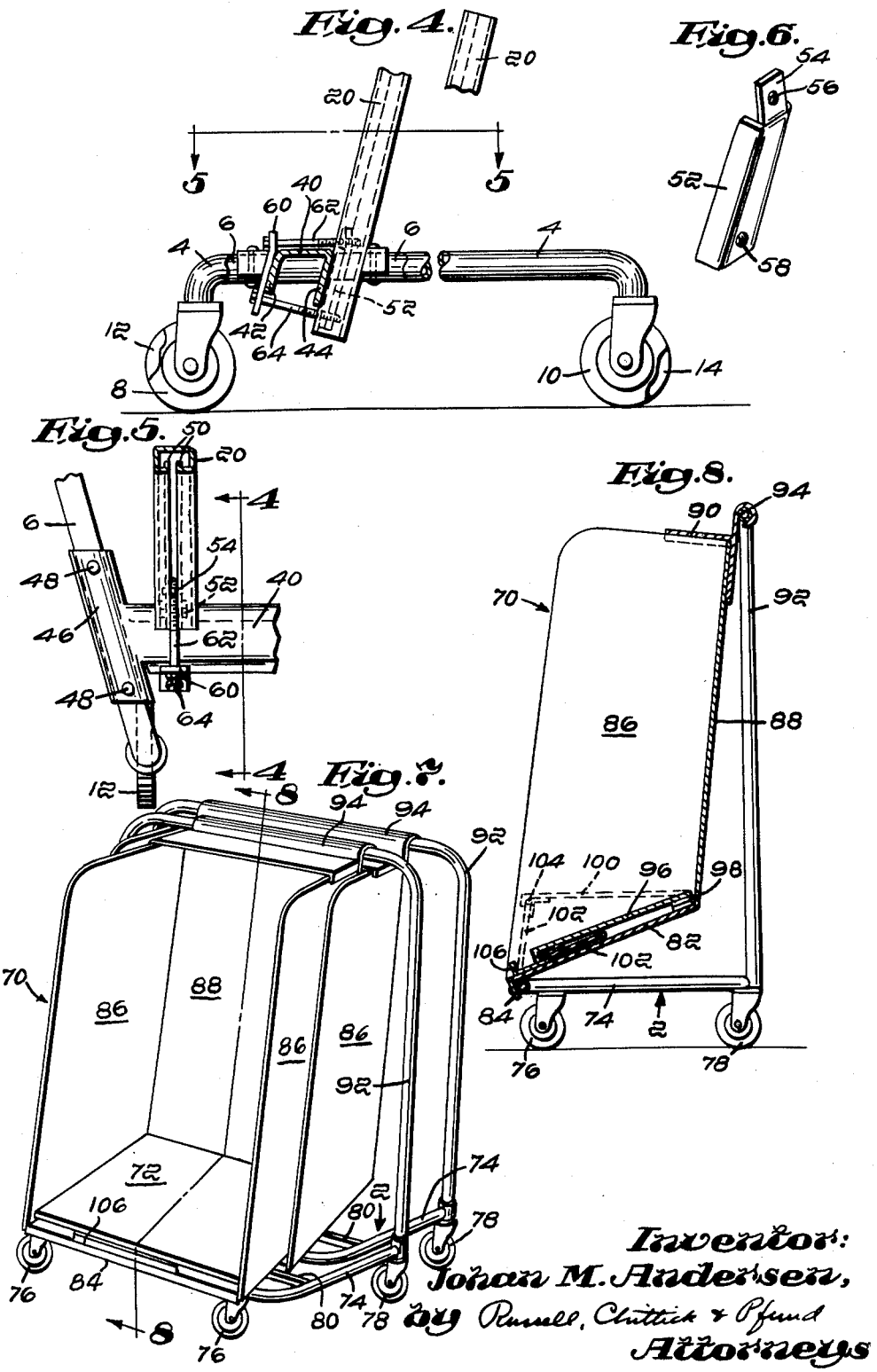

Dec. 21, 1965      J. M. ANDERSEN      3,224,787
NESTABLE INDUSTRIAL CART
Filed Sept. 27, 1963      4 Sheets-Sheet 3
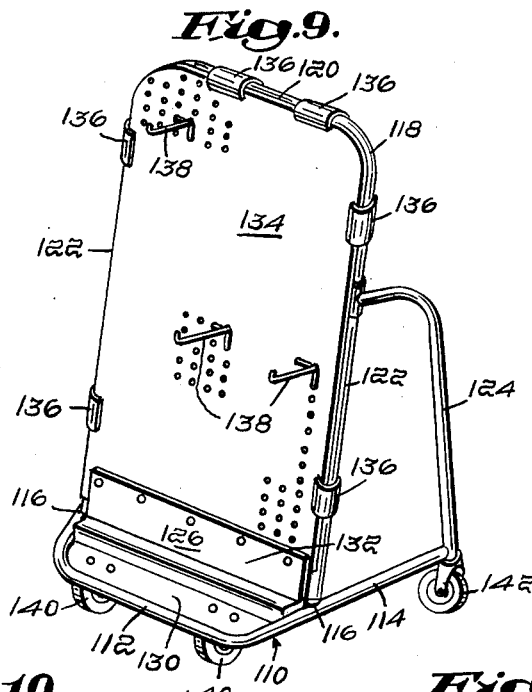
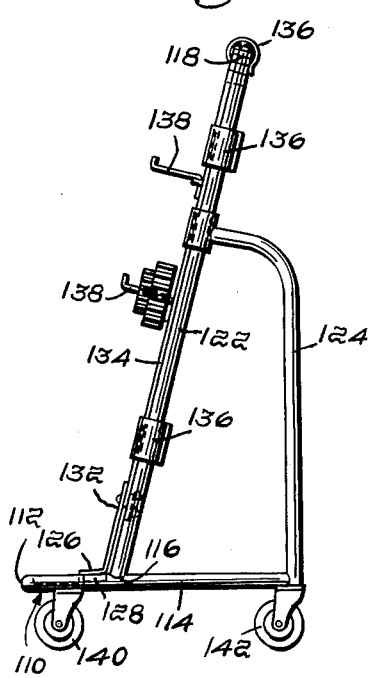
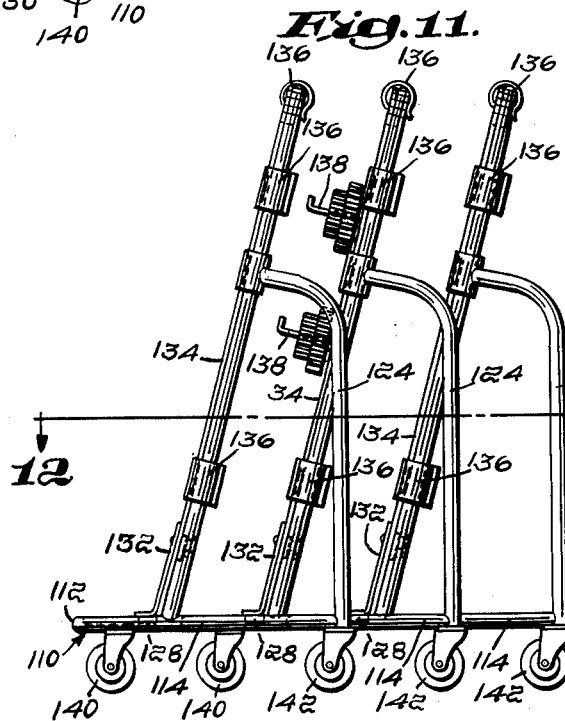
Inventor:
Johan M. Andersen,
by Russell, Chittick & Pfund
Attorneys Dec. 21, 1965  J. M. ANDERSEN  3,224,787
NESTABLE INDUSTRIAL CART
Filed Sept. 27, 1963  4 Sheets-Sheet 4
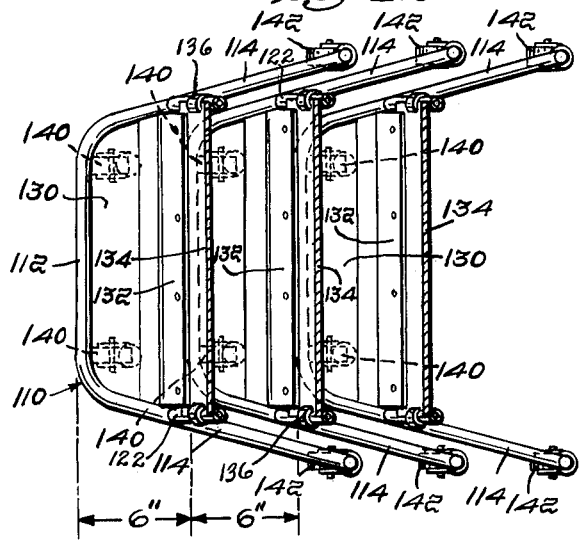
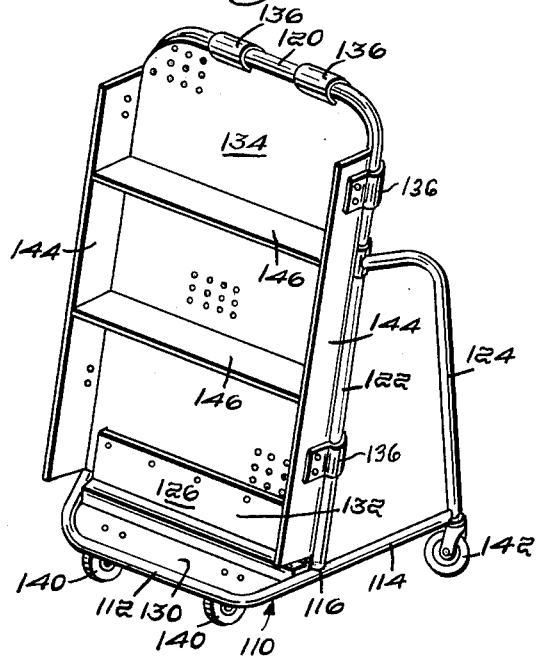
Inventor:
Johan M. Andersen,
by Russell, Chittick & Pfund
Attorneys 3,224,787
NESTABLE INDUSTRIAL CART
Johan M. Andersen, Hopkinton, Mass., assignor to Duplicon Company, Inc., Westboro, Mass., a corporation of Massachusetts
Filed Sept. 27, 1963, Ser. No. 312,205
5 Claims. (Cl. 280—33.99)

This invention relates to a manually movable industrial cart and more particularly to a movable cart that is adapted for use in a manufacturing plant to carry parts in process from one location to another.

In factories where light manufacturing is done, especially job shops which are unable to utilize assembly line techniques, it is frequently necessary to transport parts in process from machine to machine. For this purpose, wide use has previously been made of four-wheeled flat-bed hand trucks which are loaded with parts and pushed from one place to another. Also boxes and barrels, with or without wheels, have been employed.

The primary disadvantage of these types of industrial trucks is that they occupy a relatively large amount of floor space when in use adjacent a machine or when empty in a storage area. Such use of floor space is of non-productive nature and can be a serious problem in a crowded manufacturing plant. In small plants there is generally a cyclical work load which creates the need for having a large supply of industrial carts on hand to meet peak loads; but, conversely, at other times many carts will be empty. It would be highly desirable if these empty carts, and even carts containing materials not immediately needed, could be nested to occupy the smallest possible floor area.

It is, therefore, an object of this invention to provide a nestable industrial cart that has sufficient strength and capacity to carry a sizeable quantity of material yet is mobile enough, even when fully loaded, to be easily moved by hand.

Another object of this invention is to provide a nestable industrial cart on which a large number of manufactured parts can be easily loaded, securely held during transport over rough surfaces and quickly unloaded.

A further object is to provide a nestable industrial cart which can be positioned in combination with similar carts in a telescoped or nested arrangement so that each pair of nested carts occupies an amount of floor space that is only fractionally greater than that taken by one cart.

It is a still further object of this invention to provide a nestable industrial cart that can be telescopically combined with a multiplicity of other similar carts whether loaded or empty.

These and other objects of the invention will become more apparent as the description proceeds with the aid of the accompanying drawings in which:

FIG. 1 is a side elevation of a preferred embodiment of the nestable industrial cart in which the frame and upper structure have been broken away to conserve space;

FIG. 1a is a detail of an element shown in FIGS. 1, 2 and 3;

FIG. 2 in a plan view of FIG. 1;

FIG. 3 is a vertical section taken on line 3—3 of FIG. 1;

FIG. 4 is a vertical section taken on the line 4—4 of FIG. 5 showing alternate means for supporting the load carrying structure;

FIG. 5 is a horizontal section taken on the line 5—5 of FIG. 4;

FIG. 6 is a detail of an element found in FIGS. 4 and 5;

FIG. 7 shows a modified form of the invention, two carts in perspective being nested together;

FIG. 8 is a vertical section on the line 8—8 of FIG. 7;

FIG. 9 is a perspective view of still another embodiment;

FIG. 10 is a side elevation of FIG. 9 showing in addition the manner in which a work load (gears, for example) may be carried;

FIG. 11 is a side elevation of three carts of the type shown in FIGS. 9 and 10 nested together, the center cart being loaded without increasing the nesting space;

FIG. 12 is a view in horizontal section taken on the line 12—12 of FIG. 11; and

FIG. 13 is a perspective view of still another modification which includes shelves as the material supporting means.

A basic form of cart is shown in FIGS. 1, 2 and 3. This comprises a generally U-shaped frame 2, which in this arrangement consists of diverging bars 4 and 6 down turned at their ends to rest on casters 8, 10, 12 and 14. The bars are rigidly connected to a cross piece 16 secured at its ends to the bars by bolts or rivets 18. Other means of attachment, such as welding, could be used. Cross piece 16 acts as means for mounting thereon upwardly extending rearwardly sloping load or work carrying supports 20.

The work supporting structure 20 may be affixed to cross piece 16 in any convenient manner. As shown, cross piece 16 has two transverse flanges 22 and 24 between which are secured the support feet 26. Each foot comprises a pair of complementary plates 28 and 30 (see FIG. 1a) which are riveted as at 29 to the lower sides of supports 20. At the rear of each support is an S-shaped wedging lever 32.

The feet 26 and the lower end of lever 32 may be slid laterally into position on cross piece 16 with the toes 34 under flange 22 and the lower end of lever 32 under flange 24. By setting up on screw 36 threaded into lever 32 and bearing against the rear of support 20, the feet 26 can be locked into rigid engagement with cross piece 16 to provide the necessary strength for structure 20.

The following features, common to all of the carts shown herein, will be noted. The frame is U-shaped with the front wheels 8 and 12 closer than the rear wheels 10 and 14, permitting the frames to enter into nesting position. The structure 20 is attached to the frame 2 at a position closer to the front wheels 8 and 12 than to the rear wheels 10 and 14 and extends upwardly to the rear at a slope only slightly from the vertical. Structure 20 terminates at the top at a position in front of or about over the rear wheels.

The structure 20, consisting of the two upwardly extending bars or posts shown in FIGS. 1, 2 and 3, may carry any form of work supporting means as, for example, the punched board 134 of FIGS. 9, 10 and 11, the box arrangement of FIGS. 7 and 8, or the shelves 146 of FIG. 13. In all cases, however, the center of gravity of the work load carried by the cart will fall well within the base to provide an inherently stable cart when loaded, while at the same time permitting substantially the same degree of nesting, loaded or unloaded.

Another construction is shown in FIGS. 4, 5 and 6, in which the frame bars 4 and 6 are connected in a different manner, and the upwardly extending structures 20 are anchored by alternative means. The cross piece 40 is in the form of a down turned channel, flat on top but having flanges 42 and 44 which, for convenience, slope upwardly to the rear. At the ends of cross piece 40 are semicylindrical members 46 diverging to the rear at angles to match the required angle of divergence of bars 4 and 6. Members 46 fit over the respective bars and are riveted thereto as at 48. Thus cross piece 40 provides a rigid strong foundation for the two structures 20, one of which is shown in FIGS. 4 and 5.

Each structure 20 comprises a generally C-shaped channel, as can be seen in FIGS. 2 and 5, with inturned longitudinal flanges 50. In the construction of FIGS. 4 and 5, a short cooperating clamping channel 52, shaped to fit within channel 20, is placed therein at the lower end. Channel 52 has an upwardly extending tab 54 drilled and threaded at 56 and a second drilled and threaded hole 58 near the bottom. Acting in conjunction therewith is a front clamping plate 60 having suitably placed holes therein through which extend bolts 62 and 64 threaded into holes 56 and 58 of channel 52. The bolts pass between flanges 50 on their way to clamping channel 52. This arrangement permits the structures 20 to be adjusted both laterally and vertically of cross piece 40, whereby the two supporting structures 20 can be set in the best place to receive the work support element. Again, as in the form of FIG. 1, the cart of FIGS. 4, 5 and 6, when loaded, will be stable and nestable.

The description of FIGS. 1 to 6 should make it plain that it is the relatively vertical nature of the work support carried by structure 20 that makes possible nesting of the carts in loaded condition. Also, the basic requirement that the bottom of stucture 20 is attached to the frame nearer the front wheels than the rear is also met in FIGS. 4, 5 and 6.

Another alternative is shown in FIGS. 7 and 8. This work supporting structure is in the form of a relatively deep box 70 made for the express purpose of holding articles of dimensions which would not lend themselves to being carried by the hooks shown in FIG. 9 or the shelves of FIG. 13. When the box 70 is loaded, nesting is not possible in the manner of FIGS. 1, 4 and 11; but, on the other hand, a novel collapsible bottom 72 makes it possible for the carts to nest when empty. The construction in detail is as follows: The frame 2 is, in this case, a continuous member 74 bent to U shape and having front casters 76 and rear casters 78. A tie bar 80 may extend crosswise to give added rigidity. The box comprises a sloping bottom 82 secured by its down turned flange 84 to the front of frame 74. To this bottom are affixed side walls 86 and a back wall 88. A top wall 90, not long enough to interfere with nesting, may be added if desired. The box at the top is secured to an inverted U-shaped support and handle 92 in any convenient manner as at 94.

A false bottom 96 is useful to provide a horizontal surface when supporting certain types of loads as, for example, yarn packages. This false bottom 96 is pivoted horizontally at the rear at 98. When swung upward to horizontal position as at 100, a leg 102 pivoted at 104 may be swung downwardly to a generally vertical position to rest against a stop 106. In this condition, the box serves as a sizable container in which goods may be stacked for easy movement to a new location. When the carts are not in use, the bottoms 96 may be dropped so that the carts may nest closely as shown in FIG. 7. In this construction, as in the others, the structure 70 is supported on the frame near the front wheels and slopes rearwardly at a steep angle, terminating at the top forward of or close to the line of the rear wheels to give a stable loaded condition and nestable capability when unloaded.

Reference will now be made to the carts shown in FIGS. 9 to 13. In these figures, there is a U-shaped base frame generally designated as 110. Base frame 110 consists of a forward frame member 112 and two rearwardly diverging side frame members 114. Base frame 110 is preferably constructed of tubular steel or aluminum which can be easily bent to the desired configuration.

Affixed to base frame 110 and extending upwardly from mounting locations 116 is carrier board supporting structure 118, preferably being a tubular frame of inverted U shape. Carrier board structure 118 can be welded or bolted to mounting locations 116, which preferably are placed well forward on side frame members 114. Carrier board structure 118 consists of a top support segment 120 and side support segments 122 and, although being substantially upright, is preferably slanted slightly to the rear from the vertical. This inclined position serves to prevent materials in process from slipping or being jostled off the carrying means while in transit. Carrier board supporting structure 118 is preferably of a construction similar to base frame 110.

To give rigidity to carrier board structure 118, a pair of curved bracing posts 124 are provided between side support segments 122 and the rearmost portions of side frame members 114 of base frame 110. The cart framing is thus composed of rigidly connected elements to provide a frame capable of supporting and transporting in safety a load of considerable weight.

It will be seen in FIG. 9 that a flooring 126 of sheet metal or the like is provided to close the area within the periphery of the forward portion of base frame 110. Flooring 126 is shaped in a stepped configuration to form a horizontal floor 130 and a substantially vertical retaining wall 132 and can optionally be supported by a transverse member 128 spanning side frame members 114.

Mounted within the U-shaped configuration of carrier board structure 118 is carrier board 134, which can be made of steel, expanded metal lath or perforated wall board, such as that sold under the trade mark "Masonite" (commonly called peg board). The carrier board 134 is secured at its bottom edge to retaining wall 132 with bolts and wing nuts and is affixed to supporting structure 118 by means of a multiplicity of brackets 136 which are preferably of the quick releasing type. This provides the industrial cart of FIGS. 1 to 13 with the capability of interchanging carrier boards. Such a feature is desirable in a small manufacturing plant where various types of parts are produced requiring differently shaped carrying means. Detachably mounted in carrier board 134 is a multiplicity of hooks acting as finger-like holding means 138 on which can be loaded parts having a hole therein, such as gear wheels, two of which are shown in FIG. 10. Of course, supports 138 can be of any form necessary to accommodate parts having a wide variety of shapes and sizes. To facilitate carrying long materials, such as rods or bars, flooring 126 will cooperate with holding means 138 to permit vertical stacking.

An example of a modification of the present invention is shown in FIG. 13. Here carrier board 134 is shown having sides 144 and shelves 146 which are positioned to carry parts not mountable on the hooks 138 of FIG. 9. Other types of carrier boards can be used and it is a feature of this invention that the quick release brackets 136 enable the operator to rapidly replace one type of carrier board with another. This allows the cart to be used with a wide assortment of material shapes and sizes.

As in FIGS. 1 to 8, the carts of FIGS. 9 to 13 have front wheels 140 secured to and positioned beneath flooring 126. The front wheels 140 in this arrangement are spaced apart a distance less than the width of forward frame member 112 and do not protrude at any point outside the periphery of base frame 110. Rear wheels 142 are mounted beneath bracing posts 124 and spaced sufficiently to permit entry therebetween of the front of another cart. The wheels are preferably caster to give maximum maneuverability.

It will be noted in FIG. 11 that the cart of FIG. 9, when nested with two other similar carts, occupies a floor area only slightly larger than that taken up by one cart. As previously noted in reference to FIGS. 1 to 8, the carts of FIGS. 9 to 13 have the capability of nesting when they are completely loaded or unloaded. In FIG. 11, it will be seen that the second cart carries a number of parts but there is no interference with the other nested carts regardless of whether they are loaded or not.

The telescopic nesting action of the industrial cart can be clearly seen in FIG. 12. The diverging U-shaped frame 110 and the positioning of wheels 140 and 142 facilitate the close nesting of the several carts. It will also be appreciated that a group of nested carts, whether loaded or not, can be pushed as a unit. This attribute allows one man to move several fully loaded carts, often as many as ten, from place to place. This one feature can, therefore, save a worker much time and effort compared to that required in moving an equal number of standard flat bed trucks.

In operation, each operator will preferably have at hand one or more carts containing goods to be worked on or used, plus a number of empty carts onto which the parts are to be placed when ready for movement to a new location. As the operation on each part is completed, the operator places that part in box 70, on carrier board 134 or on shelf 146 until the cart is loaded to capacity. Preferably the operator would load several carts, each of which would be nested together after being loaded to capacity. Thereafter, the nested loaded carts may be moved in a single caravan to the next machine location for further processing.

It should be noted that the nested caravan can be of both loaded and empty carts in any order which gives great flexibility of operation.

Obviously, many modifications and variations of the present invention are possible in the light of the above teachings. Therefore, it is to be understood that the invention is not limited in its application to the details of the constructions and arrangement of parts specifically described or illustrated and that, within the scope of the appended claims, it may be practiced otherwise than as specifically described or illustrated.

I claim:

1. A nestable industrial cart comprising a base frame comprising a front cross frame member and two side frame bars, the extreme dimension of said front frame member being less than the distance between the rearmost points of said side frame bars, a transverse cross bar connecting said side frame bars at a point well forward thereon, a carrier board supporting structure comprising an upper carrier board cross frame and two side carrier board frames, said side carrier board frames attached to said base frame near the points of intersection of said transverse cross bar therewith, said carrier board supporting structure being inclined from the vertical in an upward and rearward direction, a carrier board detachably fastened to said carrier board supporting structure, said carrier board mounting a multiplicity of cantilevered elements extending normal to the forward surface thereof to receive and retain articles thereon, a floor disposed within the forward periphery of said base frame and the bottom margin of said carrier board and attached thereto, a pair of braces each extending from one of said side frame bars upwardly to one of said side carrier board frames, and two pairs of wheels carried beneath said base frame, a first pair of said wheels affixed under said forward cross frame member adjacent the forward ends of said side frame bars, and a second pair of said wheels affixed adjacent the trailing ends of said side frame bars and spaced apart a distance greater than that separating the first pair of wheels.

2. A nestable industrial cart as set forth in claim 1, wherein said carrier board has side walls extending forwardly from the lateral margins thereof and said elements comprise shelves positioned between said side walls to receive and retain industrial articles thereon during transport.

3. A nestable industrial cart comprising a base frame which includes a front cross member and two side frame bars diverging rearwardly, a carrier board supporting structure comprising an upper cross segment and two side segments, said side segments attached to said base side frame bars, the said two side segments being straight and parallel and inclined from the vertical in an upward and rearward direction, a carrier board detachably fastened to said two side segments, said carrier board having means extending forwardly therefrom for supporting work units, a floor disposed within the forward periphery of said base frame and terminating at the rear along a line adjacent the points of connection of said side segments with said base side frame bars, a pair of braces each extending from one of said side frame bars upwardly to one of said side segments, said braces being spaced laterally a distance greater than the maximum width of said forwardly extending work supporting means, a first pair of wheels affixed under said base frame adjacent the forward ends of said side frame bars and a second pair of wheels affixed adjacent the trailing ends of said side frame bars and spaced apart a distance greater than that separating the said first pair of wheels.

4. An industrial cart adapted to nest with an identical cart whether loaded or unloaded, said cart comprising a generally U-shaped base frame having diverging rearwardly extending side bars, two wheels at the front of the frame and two wheels more widely spaced at the rear of the frame, supporting structure comprising two parallel side segments extending upwardly and rearwardly connected at their lower ends with said side bars and at their upper ends with a common top segment, the points of connection of said segments with said bars defining an area within the front of said frame, a work supporting floor secured to said frame within said area, a transversely extending carrier board attached to said side segments, one or more shelves extending forwardly from said carrier board a distance not more than approximately the front to rear dimension of said floor, side walls at the ends of each shelf having a distance therebetween of approximately the distance between said parallel segments, a pair of braces each extending upwardly from the rear of one of said side frame bars to one of said side segments, said braces being spaced apart laterally a distance greater than the width of said shelves whereby when identical carts are fully loaded the shelves and the loads thereon of the rear cart may enter between the braces of the front cart, the extent of the nesting being substantially the same as when the carts are unloaded.

5. An industrial cart adapted to nest with an identical cart whether loaded or unloaded, said cart comprising a generally U-shaped base frame having diverging rearwardly extending side bars, two wheels at the front of the frame and two wheels more widely spaced at the rear of the frame, supporting structure comprising two parallel side segments extending upwardly and rearwardly connected at their lower ends with said side bars and at their upper ends with a common top segment, the point of connection of said segments with said side bars defining an area within the front of said frame, a work supporting floor secured to said frame within said area, a transversely extending carrier board attached to said side segments, said carrier board having work supporting means extending forwardly therefrom a distance not more than approximately the front to rear dimensions of said floor, the maximum lateral dimension of said work supporting means and work loaded thereon being approximately the distance between said parallel segments, a pair of braces each extending upwardly from the rear of one of said side frame bars to one of said side segments, said braces being spaced apart laterally a distance greater than the said maximum lateral dimension of said work supporting means when loaded with work units whereby when identical carts are fully loaded the work units and work supporting means of the rear cart may enter between the braces of the front cart, the extent of the nesting being substantially the same as when the carts are unloaded.

References Cited by the Examiner

UNITED STATES PATENTS

| | | | |
|---|---|---|---|
| 2,596,686 | 5/1952 | Hess | 280—33.99 |
| 2,760,647 | 8/1956 | Saul | 211—13 |
| 2,764,419 | 9/1956 | Enders | 280—33.99 |
| 2,863,567 | 12/1958 | Friar. | |
| 2,920,767 | 1/1960 | Halip. | |

FOREIGN PATENTS 1,163,199    4/1958    France.

BENJAMIN HERSH, *Primary Examiner.*

A. HARRY LEVY, *Examiner.*